(12) United States Patent
Su

(10) Patent No.: US 12,459,388 B2
(45) Date of Patent: Nov. 4, 2025

(54) CHARGING STATION

(71) Applicant: SUPER GROUP SEMICONDUCTOR CO., LTD., Hsinchu County (TW)

(72) Inventor: Jen-Jun Su, Hsinchu County (TW)

(73) Assignee: SUPER GROUP SEMICONDUCTOR CO., LTD., Hsinchu County (TW)

( * ) Notice: Subject to any disclaimer, the term of this patent is extended or adjusted under 35 U.S.C. 154(b) by 667 days.

(21) Appl. No.: 17/931,133

(22) Filed: Sep. 11, 2022

(65) Prior Publication Data

US 2023/0302935 A1 Sep. 28, 2023

(30) Foreign Application Priority Data

Mar. 24, 2022 (TW) .................................. 111111153

(51) Int. Cl.
| | |
|---|---|
| *B60L 53/00* | (2019.01) |
| *B60L 53/12* | (2019.01) |
| *B60L 53/34* | (2019.01) |
| *B60L 53/38* | (2019.01) |
| *H02J 50/00* | (2016.01) |

(52) U.S. Cl.
CPC ............... *B60L 53/38* (2019.02); *B60L 53/12* (2019.02); *B60L 53/34* (2019.02); *H02J 50/005* (2020.01)

(58) Field of Classification Search
CPC .......... B60L 53/12; B60L 53/34; B60L 53/38; B60L 53/122; B60Y 2200/91; H02J 50/005; H02J 50/10; H02J 50/90; Y02T 10/7072; Y02T 90/12; Y02T 90/14
USPC ....................................................... 320/109
See application file for complete search history.

(56) References Cited

U.S. PATENT DOCUMENTS

| | | | | |
|---|---|---|---|---|
| 5,703,461 A | * | 12/1997 | Minoshima | B60L 53/126 |
| | | | | 320/108 |
| 6,157,162 A | * | 12/2000 | Hayashi | H02J 7/0042 |
| | | | | 320/104 |
| 2021/0155102 A1 | * | 5/2021 | Shin | H02J 7/0045 |

FOREIGN PATENT DOCUMENTS

| | | | | |
|---|---|---|---|---|
| CN | 110546030 A | | 12/2019 | |
| CN | 110758130 A | * | 2/2020 | ............ B60L 53/126 |
| CN | 112644300 A | | 4/2021 | |
| JP | H0561545 A | | 3/1993 | |
| JP | H09215211 A | | 8/1997 | |
| KR | 20180068201 A | | 6/2018 | |
| TW | 202206307 A | | 2/2022 | |
| WO | WO-2013053389 A1 | * | 4/2013 | ............. B60L 53/38 |
| WO | 2021/116905 A1 | | 6/2021 | |

* cited by examiner

*Primary Examiner* — Julian D Huffman
*Assistant Examiner* — Ryu-Sung P. Weinmann
(74) *Attorney, Agent, or Firm* — CKC & Partners Co., LLC

(57) ABSTRACT

A charging station includes a front-mount module, a support member, two moving assembles, two supporting arms and a control unit. The front-mount module includes a charging head and a coil disposed within the charging head. The support member is separated from the front-mount module. Each of the moving assembles includes a movable member supported by the support member, and a motor device for moving the movable member along the support member. Each of the supporting arms is pivotally connected to the front-mount module and one of the supporting arms, respectively. The control unit is electrically connected to the motor devices for controlling the motor devices to adjust the position of the front-mount module.

20 Claims, 17 Drawing Sheets

CHARGING STATION

RELATED APPLICATIONS

This application claims priority to Taiwan Application Serial Number 111111153, filed on Mar. 24, 2022, which is herein incorporated by reference.

BACKGROUND

Field of Disclosure

The present disclosure relates to a charging station. More particularly, the present disclosure relates to a charging station capable of providing wireless charging.

Description of Related Art

Recently, wireless charging technology has been widely used in charging tasks of electric vehicles. For example, when an electric car is parked at a charging station, a power supply coil of the charging station is induced to a receiving coil of the electric car so as to provide the required electric power for the electric car.

However, when an electric car that is parked is deviated from the charging station so that the receiving coil of the electric car fails to be aligned with the power supply coil of the charging station, the charging efficiency, the charging cycle time and the driving willingness are affected.

Therefore, the above-mentioned technology apparently is still with inconvenience and defects and needed to be further develop. Hence, how to develop a solution to improve the foregoing deficiencies and inconvenience is an important issue that relevant persons engaged in the industry are currently unable to delay.

SUMMARY

One aspect of the present disclosure is to provide a charging station to solve the aforementioned problems of the prior art.

In one embodiment of the present disclosure, the charging station includes a front-mount module, at least one support member, two moving assembles, two supporting arms and at least one control unit. The front-mount module includes a charging head and a first coil disposed within the charging head for inducing a second coil of a mobile vehicle. The support member is separated from the front-mount module. Each of the moving assembles includes a movable member and a motor device. The movable member is supported by the support member, and the motor device is used for moving the movable member along the support member. Each of the supporting arms is pivotally connected to the front-mount module and one of the movable members, respectively. The control unit is electrically connected to the motor devices for controlling the motor devices to adjust the position of the front-mount module.

According to one or more embodiments of the present disclosure, in the charging station, the disclosure is able to rapidly align the power supply coil of the charging station with the receiving coil of the mobile vehicle, thereby optimizing the charging efficiency and the charging cycle time, as well as the driving willingness.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
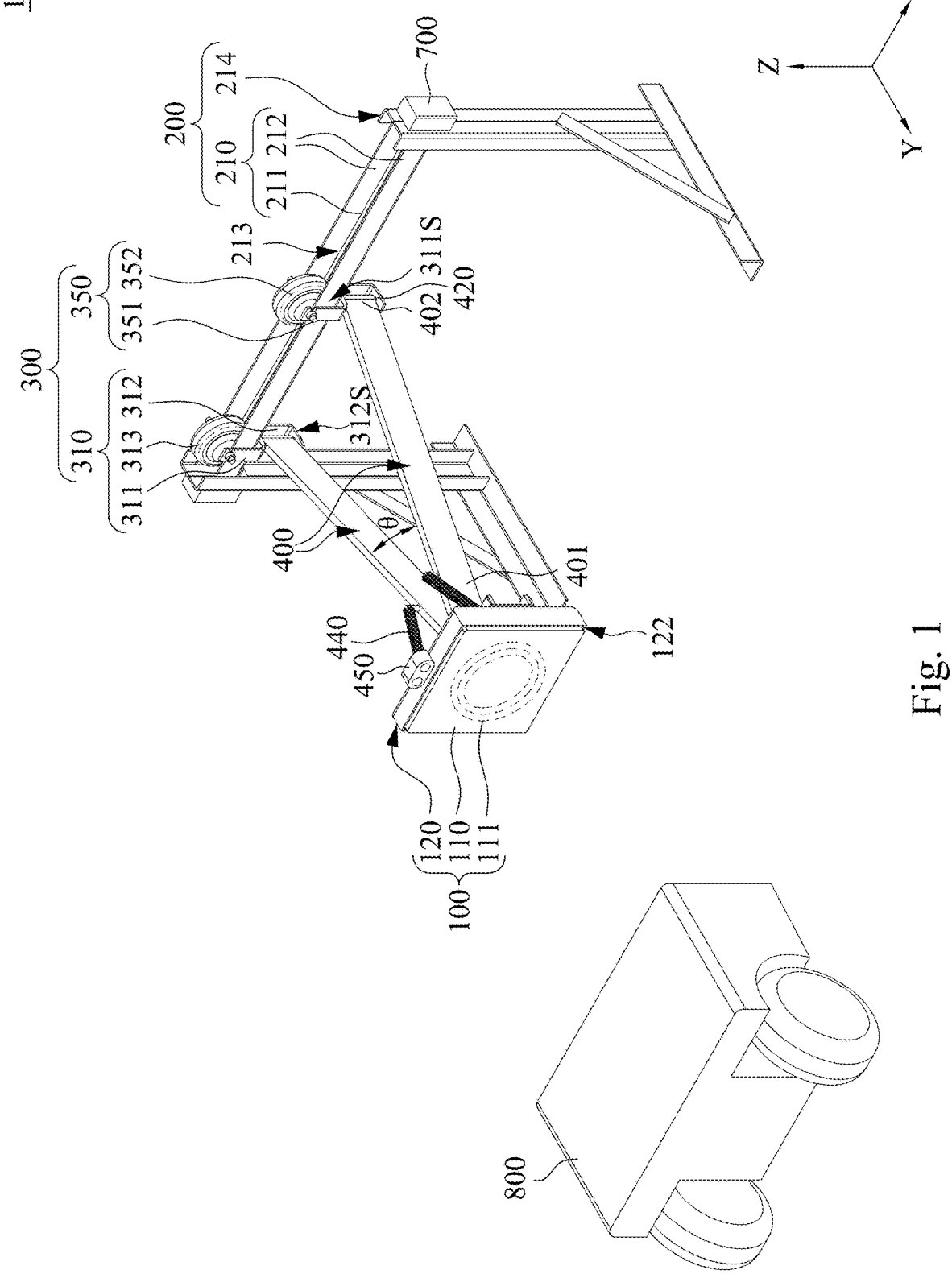
FIG. 1 is a schematic view of a charging station and a mobile vehicle according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
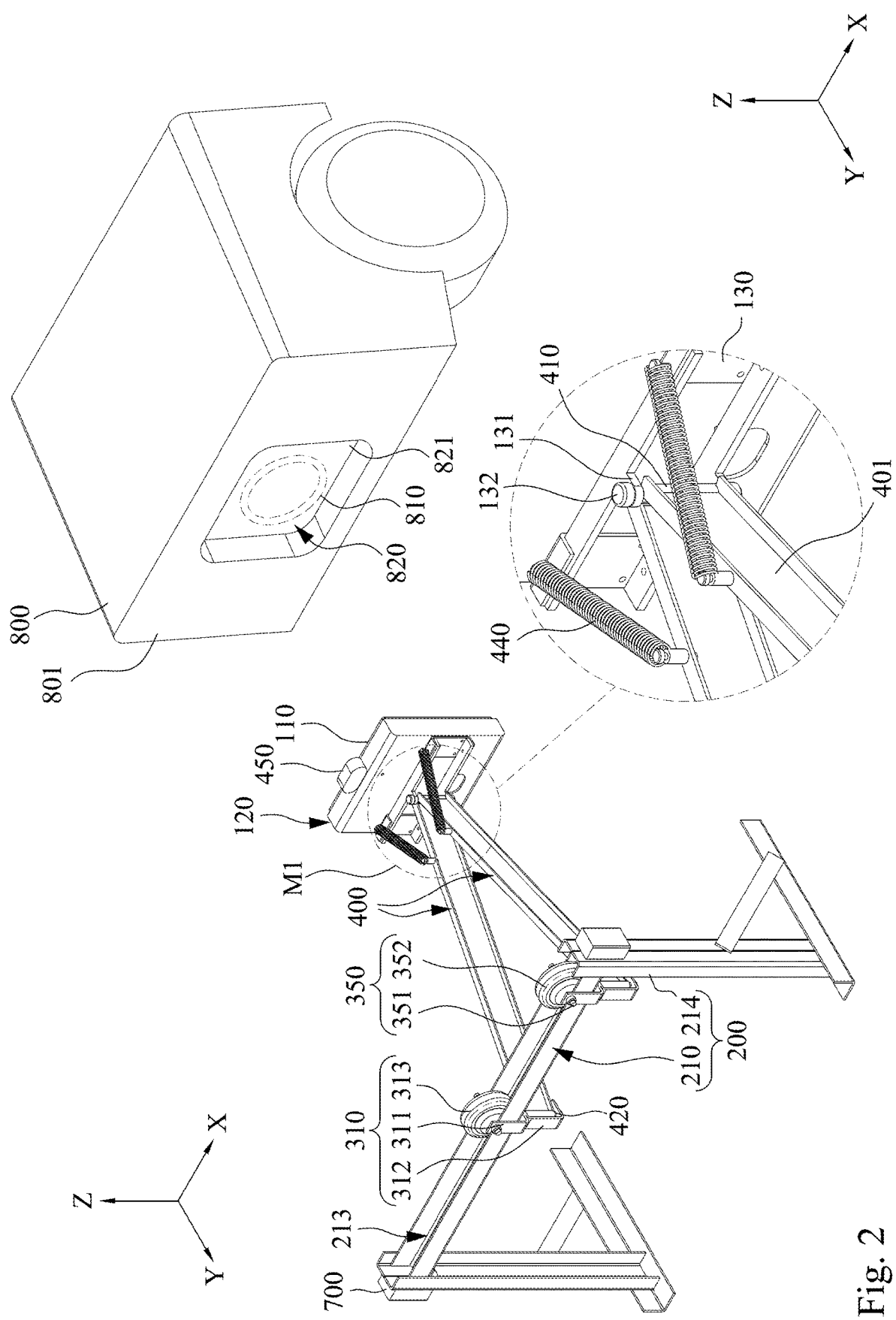
FIG. 2 is a schematic diagram of FIG. 1 viewed from another aspect as well as a partial enlarged view of an area M1 of FIG. 2.

Reference is now made to FIG. 1 to FIG. 2, in which FIG. 1 is a schematic view of a charging station 10 and a mobile vehicle 800 according to one embodiment of the present disclosure, and FIG. 2 is a schematic diagram of FIG. 1 viewed from another aspect as well as a partial enlarged view of an area M1 of FIG. 2. As shown in FIG. 1 to FIG. 2, the charging station 10 includes a front-mount module 100, a support member 200, one or more control units 700, two moving assembles 300 and two supporting arms 400. The front-mount module 100 is separated from the support member 200. The front-mount module 100 includes a charging head 110 and one or more power supply coil 111 disposed within the charging head 110 for receiving electric power transmitted from a power source externally. These moving assembles 300 are able to be moved independently. More specifically, each of the moving assembles 300 includes a movable member 310 and a motor device 350. The movable member 310 is supported by the support member 200, and reciprocatedly moved along the long axis direction (e.g., X axis) of the support member 200. Each of the supporting arms 400 is pivotally connected to the front-mount module 100 and one of the movable members 310, respectively. For example, one end of each of the supporting arms 400 is pivotally connected to the front-mount module 100, and the other end thereof is pivotally connected to one of the movable members 310. The control units 700 are respectively electrically connected to the motor devices 350 for controlling the operation of the motor devices 350.

Thus, when a mobile vehicle 800 docks to the charging station 10, the control units 700 respectively move the moving assembles 300 according to the parking position of the mobile vehicle 800, so as to adjust the position of the front-mount module 100 so that the power supply coil 111 is just coupled to the receiving coil 810 of the mobile vehicle 800. The power supply coil 111 of the front-mount module 100 can induce the receiving coil 810 of the mobile vehicle 800 so as to charge the mobile vehicle 800.

For example, when the control units 700 control the moving assembles 300 to move in the opposite directions, an included angle θ of the supporting arms 400 can be adjusted, so that the charging head 110 can perform with a telescopic movement, that is, the charging head 110 can be moved along a longitudinal direction (e.g., Y axis). When the control units 700 control the moving assembles 300 to move in the same direction, the charging head 110 can be moved transversally for adjusting its position along a transverse direction (e.g., X axis).

In the embodiment, as shown in FIG. 1, the front-mount module 100 includes a front frame 120 and a recess 122 formed on one surface of the front frame 120 facing away from the moving assembles 300, and the charging head 110 is received within the recess 122. More specifically, one part of the charging head 110 is disposed inside the recess 122, and the other part of the charging head 110 is protruded outwards from the recess 122, and the power supply coil 111 is located outside the recess 122. However, the disclosure is not limited thereto. As shown in FIG. 2, an end portion 801 of the mobile vehicle 800 is concavely formed with a sunken portion 820. The receiving coil 810 of the mobile vehicle 800 is embedded within the mobile vehicle 800, and faces towards a bottom surface 821 of the sunken portion 820 in the mobile vehicle 800. Thus, when the mobile vehicle 800 docks to the charging head 110, by adjusting the position of the charging head 110, the charging head 110 can exactly extend into the sunken portion 820, so that the power supply coil 111 can induce the receiving coil 810 in the sunken portion 820 so as to charge the mobile vehicle 800. The sunken portion 820 is, for example, a rectangle, and is consistent with the outline of the front frame 120, however, the disclosure is not limited thereto.

As shown in FIG. 1 and FIG. 2, the front-mount module 100 further includes a first pivoting frame 130. The first pivoting frame 130 is fixedly connected to one surface of the front frame 120 facing away from the recess 122. The first pivoting frame 130 is provided with at least one first pivoting portion 131 (e.g., shaft-received hole).

Each of the supporting arms 400 is provided with a first end 401 and a second end 402 which are opposite to each other. The first end 401 of each of the supporting arms 400 is formed with a second pivoting portion 410 (e.g., shaft-received hole), and the second end 402 thereof is formed with a third pivoting portion 420 (e.g., shaft-received hole).

After the supporting arms 400 and the front-mount module 100 are connected to each other, the second pivoting portion 410 and the first pivoting portion 131 are coaxially aligned together along a gravity direction (e.g., Z axis) so as to be commonly inserted through by the first pivot shaft 132. The gravity direction (e.g., Z axis) and the long axis direction (e.g., X axis) of the support member 200 are orthogonal to each other.

Therefore, the supporting arms 400 can be rotated relative to each other so as to adjust a rotating angle θ of the supporting arms 400, meanwhile, the front-mount module 100 can also be rotated relative to the supporting arms 400 so as to adjust the rotating angle of the charging head 110 relative to the supporting arms 400. The third pivoting portion 420 is pivotally connected to the movable member 310. Therefore, each of the supporting arms 400 can independently rotate relative to the movable member 310.

In addition, the charging station 10 further includes two spring elements 440, each of the spring elements 440 is respectively connected to one of the supporting arms 400 and one end of the first pivoting frame 130. In this way, after the front-mount module 100 is rotated relative to the supporting arms 400, the front-mount module 100 can be pulled back to its original position by the restoring elastic force of the spring elements 440. Each of the spring elements 440 is, for example, a telescopic spring, however, the disclosure is not limited thereto.

In the embodiment, as shown in FIG. 1 and FIG. 2, for example, the support member 200 includes a first linear frame 210 and two foot stands 214. The first linear frame 210 is located between the foot stands 214, and elevated by the foot stands 214. The control units 700 are respectively located at outer sides of the foot stands 214, and respectively control the respect motor device 350 to link the corresponding one of the movable member 310. However, the disclosure is not limited thereto.

More specifically, a cross-section of the first linear frame 210 is in an U-shape, and the linear frame is formed with a bottom plate 211 and two side plates 212. The side plates 212 are respectively located on two opposite sides of the bottom plate 211, and commonly extend in the same direction so that a first receiving groove 213 is defined by the bottom plate 211 and the side plates 212. Each of the movable members 310 includes a first shaft-received frame 311, a second shaft-received frame 312 and a rotatable wheel 313. The first shaft-received frame 311 is slidably disposed on the first linear frame 210. The second shaft-received frame 312 is connected to the first shaft-received frame 311, and pivotally connected to the third pivoting portion 420 of one of the supporting arms 400. The rotatable wheel 313 is rotatably located within the first receiving groove 213, partially protrudes outwards from the first receiving groove 213, and pivotally connected to the first shaft-received frame 311.

For example, a cross-section of the first shaft-received frame 311 and a cross-section of the second shaft-received frame 312 are respectively in an U-shape, that is, the first shaft-received frame 311 and the second shaft-received frame 312 are formed with concave portions 311S, 312S respectively. The rotatable wheel 313 and the first linear frame 210 are located within the concave portion 311S of the first shaft-received frame 311, and the rotatable wheel 313 is pivotally disposed on the first shaft-received frame 311. One of the supporting arms 400 is located within the concave portion 312S of the second shaft-received frame 312, and pivotally mounted on the second shaft-received frame 312, that is, the third pivoting portion 420 is located within the concave portion 312S of the second shaft-received frame 312, and is pivotally connected to the second shaft-received frame 312. The rotatable wheel 313 is received within the first receiving groove 213, and rotatably abuts against the aforementioned bottom plate 211 so as to relatively move along the first receiving groove 213. The shaft axle (e.g., Y axis) of the rotatable wheel 313 and the long axis direction (e.g., X axis) of the first receiving groove 213 are orthogonal to each other.

The motor devices 350 are located inside the rotatable wheel 313, respectively. More specifically, each of the motor devices 350 is, for example, an in-wheel motor including a rotating shaft 351 and a main body 352. The rotating shaft 351 is rotatable relative to the main body 352. The main body 352 is wrapped inside one of the rotatable wheels 313, and the rotating shaft 351 is fixedly connected to the first shaft-received frame 311 through the rotatable wheel 313. Therefore, when each of the motor devices 350 is activated, the main body 352 of the motor device 350 can be rotated relative to the rotating shaft 351 to drive the rotatable wheel 313 to roll within the first receiving groove 213.

Also, the charging station 10 further includes a detecting element 450. The detecting element 450 is disposed on the front-mount module 100, and electrically connected to the control units 700. Therefore, when a mobile vehicle 800 docks to the charging station 10, the detecting element 450 detects the position of the receiving coil 810 of the mobile vehicle 800, so that each of the control units 700 can adjust the front-mount module 100 to the receiving coil 810 of the mobile vehicle 800. In the embodiment, for example, the detecting element 450 is located above the front frame 120 of the front-mount module 100.

Figure 3:
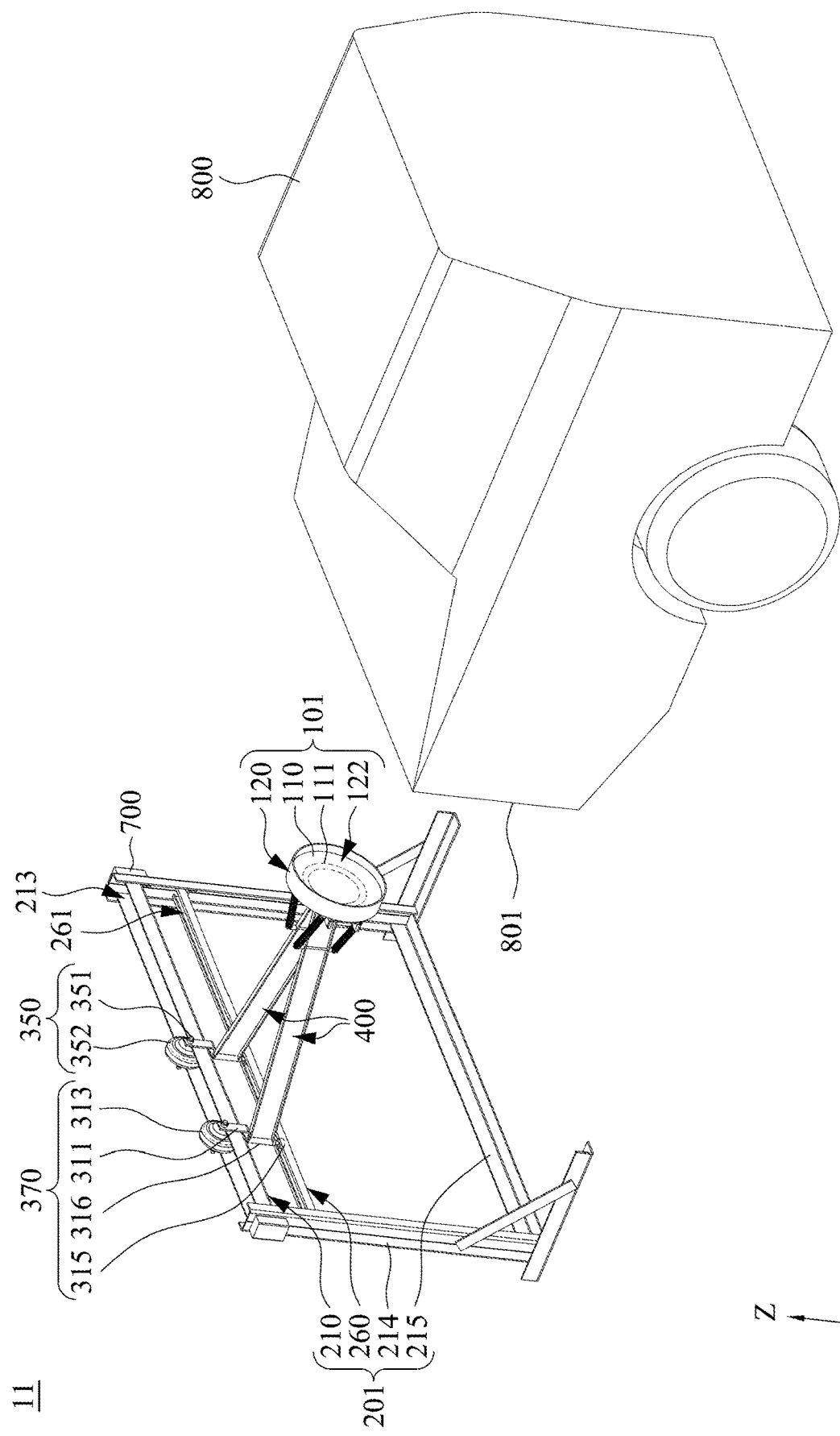
FIG. 3 is a schematic view of a charging station and a mobile vehicle according to one embodiment of the present disclosure.
Figure 4:
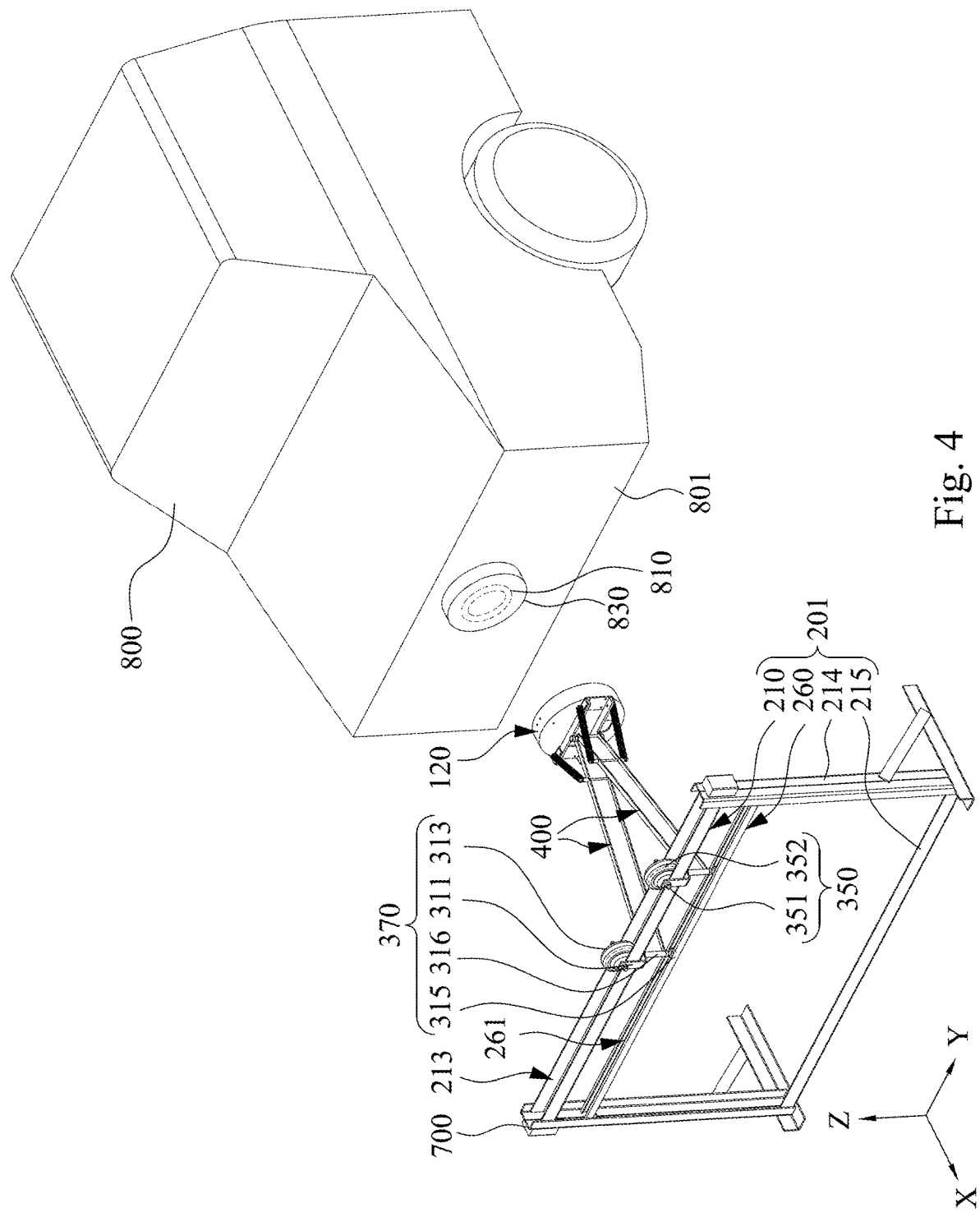
FIG. 4 is a schematic diagram of FIG. 3 viewed from another aspect.

FIG. 3 is a schematic view of a charging station 11 and a mobile vehicle 800 according to one embodiment of the present disclosure. FIG. 4 is a schematic diagram of FIG. 3 viewed from another aspect. As shown in FIG. 3 and FIG. 4, this embodiment is substantially the same as the above-mentioned embodiment, except that the support member 201 further includes a second linear frame 260 located below the first linear frame 210. The second linear frame 260 is formed with a second receiving groove 261. The long axis direction (e.g., X axis) of the first receiving groove 213 and the long axis direction (e.g., X axis) of the second receiving groove 261 are parallel to each other. Each of the movable members 370 is slidably located on the first receiving groove 213 and the second receiving groove 261 at the same time, so as to make the movement of the supporting arms 400 more stable and smooth.

More specifically, each of the movable members 370 includes a shaft-received frame 311, a rotatable wheel 313, a sliding block 315 and a pivot shaft 316. The shaft-received frame 311 is located between the first linear frame 210 and the second linear frame 260. The rotatable wheel 313 is rotatably located within the first receiving groove 213, and pivotally connected to one end of each of the shaft-received frames 311. The sliding block 315 is slidably disposed within the second receiving groove 261. The pivot shaft 316 is pivotally connected one of the supporting arms 400 to the shaft-received frame 311. One end of the pivot shaft 316 is pivotally connected to the other end of the shaft-received frame 311, and the other end of the pivot shaft 316 is connected to the sliding block 315. The sliding block 315 is slidable within the second receiving groove 261 along with the pivot shaft 316 in the X axis, but cannot leave the second receiving groove 261 in the Z axis. Also, the support member 201 further includes a reinforcing rib 215 connected to the foot stands 214 for further enhancing the structural strength of the support member 201.

In addition, comparing to the charging head 110 protruding outwards from the recess 122 in the previous embodiment, in this embodiment, the charging head 110 is totally received inside the recess 122, so that the charging head 110 only occupies one part of the recess 122. The end portion 801 of the mobile vehicle 800 is provided with a protruding portion 830, and the receiving coil 810 is embedded within the protruding portion 830. In this way, when the mobile vehicle 800 docks to the charging station 11, by adjusting the position of the charging head 110, the protruding portion 830 can exactly just extend into the recess 122 of the front frame 120, so that the power supply coil 111 and the receiving coil 810 that is located in the recess 122 are induced to each other so as to charge the mobile vehicle 800. Furthermore, a shape of the recess 122 of the front frame 120 of the front-mount module 101 is not rectangular, but circular, and the outline of the recess 122 is consistent with the outline of the protruding portion 830, however, the disclosure is not limited to the abovementioned shapes.

Figure 5:
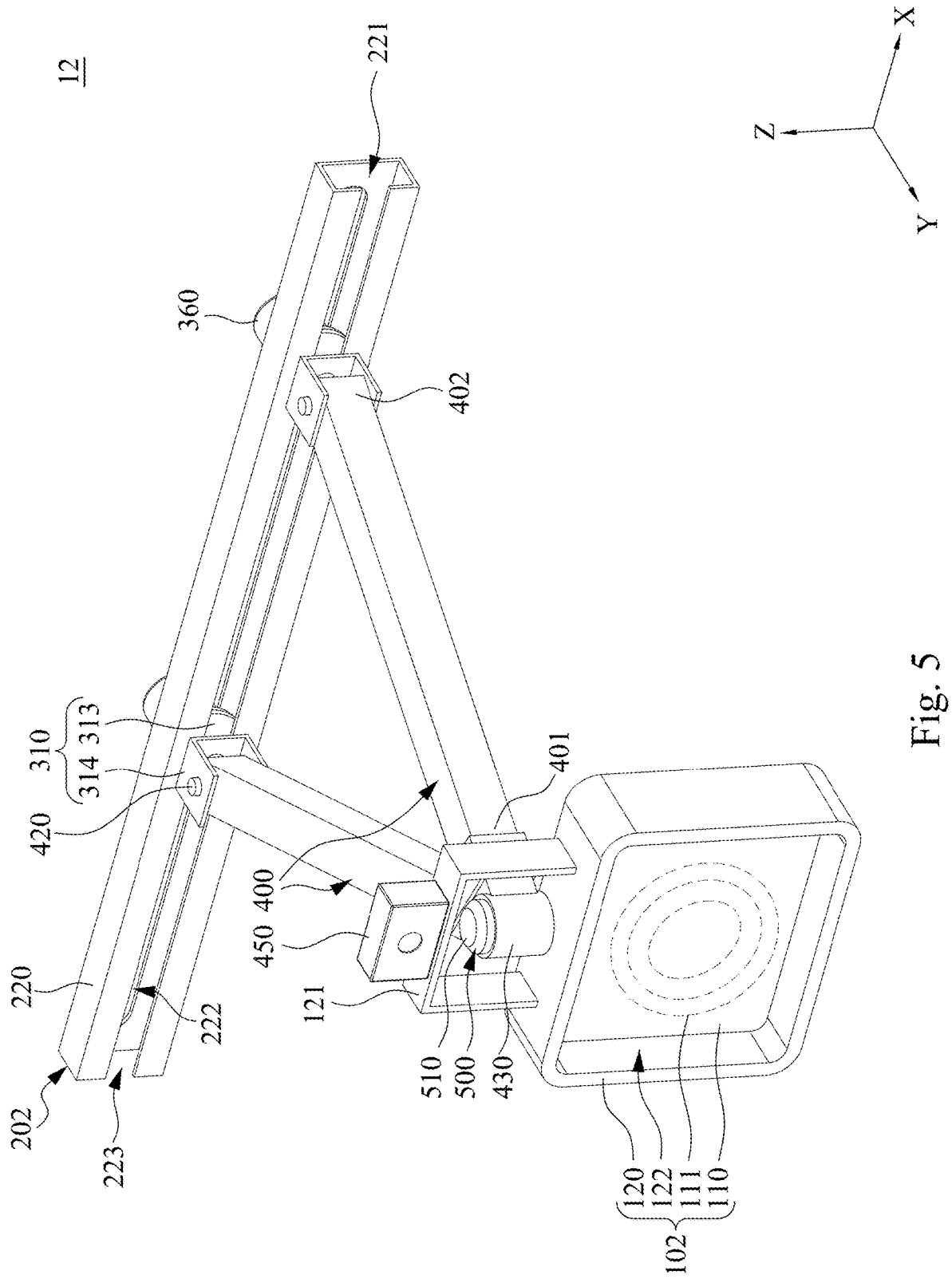
FIG. 5 is a schematic view of a charging station according to one embodiment of the present disclosure.
Figure 6:
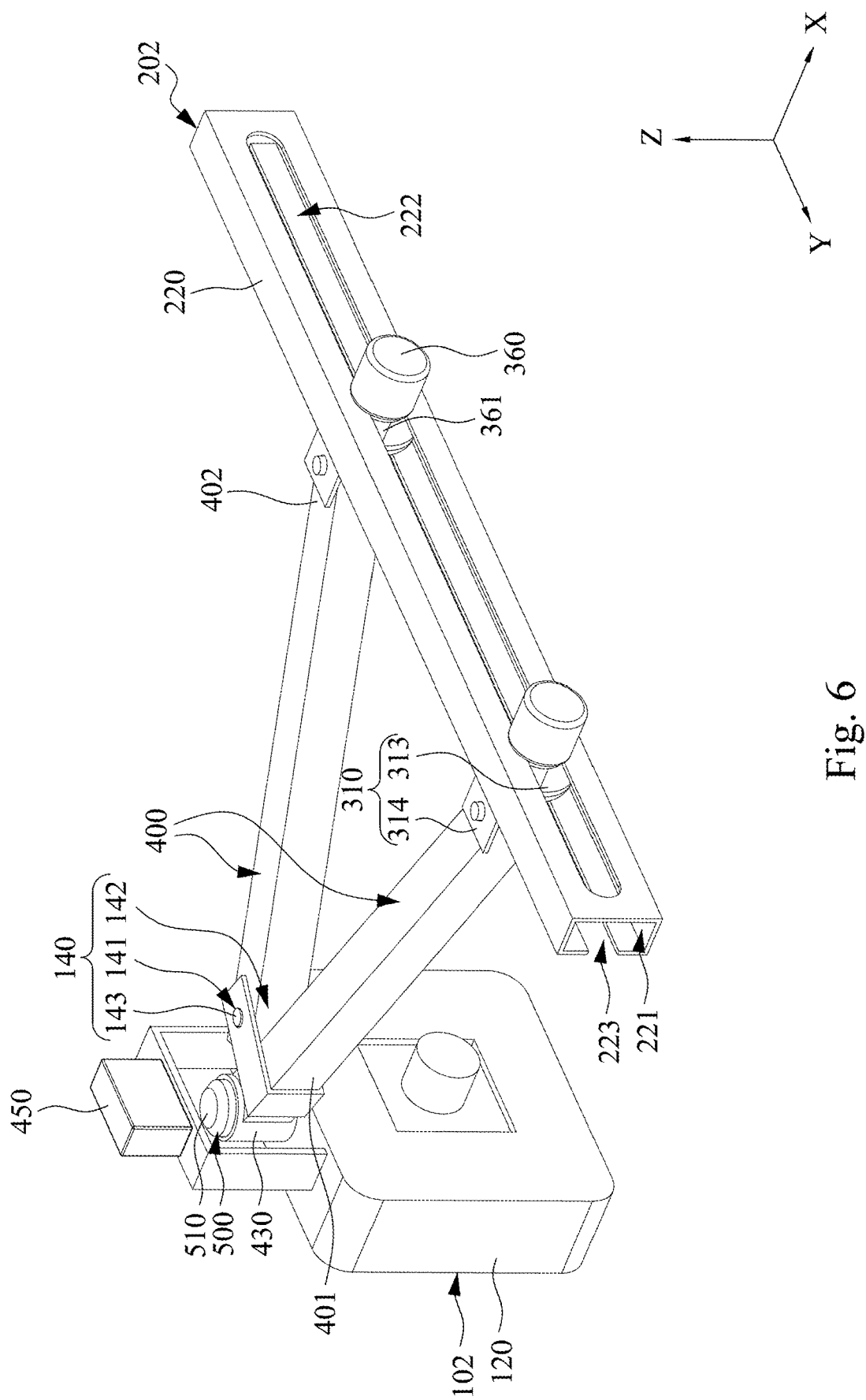
FIG. 6 is a schematic diagram of FIG. 5 viewed from another aspect.

FIG. 5 is a schematic view of a charging station 12 according to one embodiment of the present disclosure. FIG. 6 is a schematic diagram of FIG. 5 viewed from another aspect. As shown in FIG. 5 and FIG. 6, this embodiment is substantially the same as the above-mentioned embodiment, except that the charging station 12 further includes a steering module 500. The steering module 500 is at least connected to the front frame 120 of the front-mount module 102 and one of the supporting arms 400 for controlling a rotating angle of the charging head 110 relative to the supporting arms 400. More specifically, the steering module 500 includes a steering motor 510. The steering motor 510 is electrically connected to the control units 700 (FIG. 1), and connected to one of the supporting arms 400. The rotating shaft (not shown in figures) of the steering motor 510 is fixedly connected to the front frame 120. Thus, the rotating shaft of the steering motor 510 can drive the charging head 110 to steer relative to the supporting arms 400. The steering motor 510 is, for example, a conventional motor or a servo motor, however, the disclosure is not limited thereto.

In addition, the front-mount module 102 further includes a second pivoting frame 140. The second pivoting frame 140 is formed with a through opening 142 and a first pivot portion 141 (e.g., shaft-received hole). The first end 401 of one of the supporting arms 400 is provided with a second pivot portion (e.g., shaft-received hole, refer to FIG. 1). The second pivot portion is coaxially aligned with the first pivot portion 141, and the first pivot portion 141 and the first pivot portion 141 and the second pivot portion are commonly inserted through by a second pivot shaft 143. The second pivoting frame 140 is fixed to the other of the supporting arms 400, and the other of the supporting arms 400 passes through the through opening 142 of the second pivoting frame 140, and is pivotally connected to the front frame 120. More specifically, the first end 401 of the other of the supporting arms 400 is provided with a fixing portion 430 used for fixing the steering motor 510 mentioned above.

Also, the support member 202 further includes a linear frame 220, an elongated opening 222 and an elongated slot 223. The linear frame 220 is formed with a receiving groove 221. The elongated opening 222 and the elongated slot 223 are respectively formed on two opposite sides of the linear frame 220, and communicated with the receiving groove 221, respectively. The long axis directions of the elongated opening 222, the elongated slot 223 and the receiving groove 221 are parallel to each other. Each of the movable members 310 includes a shaft-received frame 314 and a rotatable wheel 313. The shaft-received frame 314 is slidably disposed on the aforementioned side of the linear frame 220, and pivotally connected to the third pivoting portion 420 of one of the supporting arms 400. The rotatable wheel 313 is totally disposed within the linear frame 220, rotatably located within the receiving groove 221, and pivotally connected to the shaft-received frame 314 through the elongated slot 223. The motor devices 360 are located outside the receiving groove 221, and the rotating shaft 361 of each of the motor devices 360 is connected to one side of the rotatable wheel 313 opposite to the shaft-received frame 314 through the elongated opening 222. Thus, the rotatable wheel 313 can be reciprocatedly rolled in the receiving groove 221 through the rotating shaft 361 of the motor device 360 synchronously rotating the rotatable wheel 313.

Figure 7:
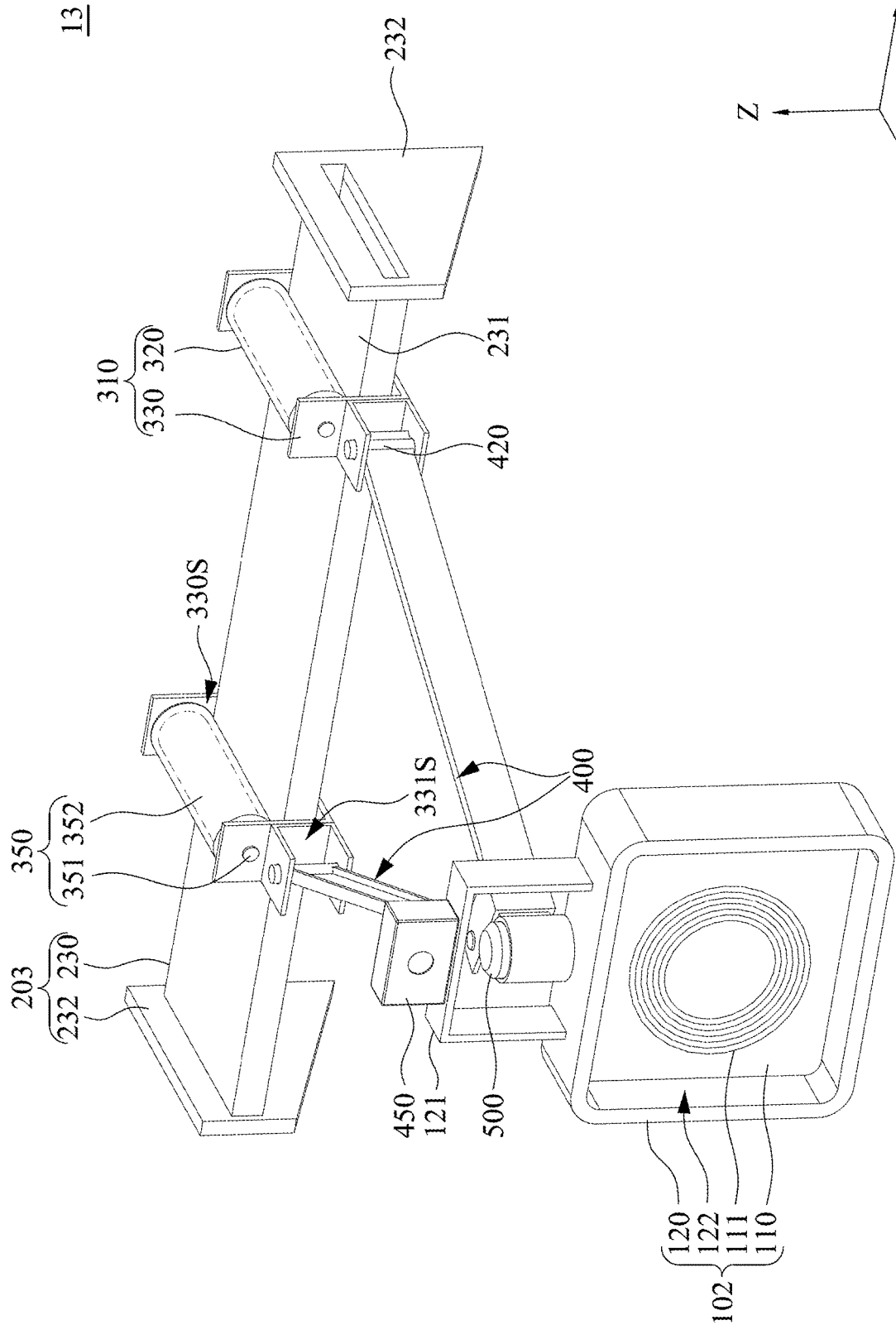
FIG. 7 is a schematic view of a charging station according to one embodiment of the present disclosure.
Figure 8:
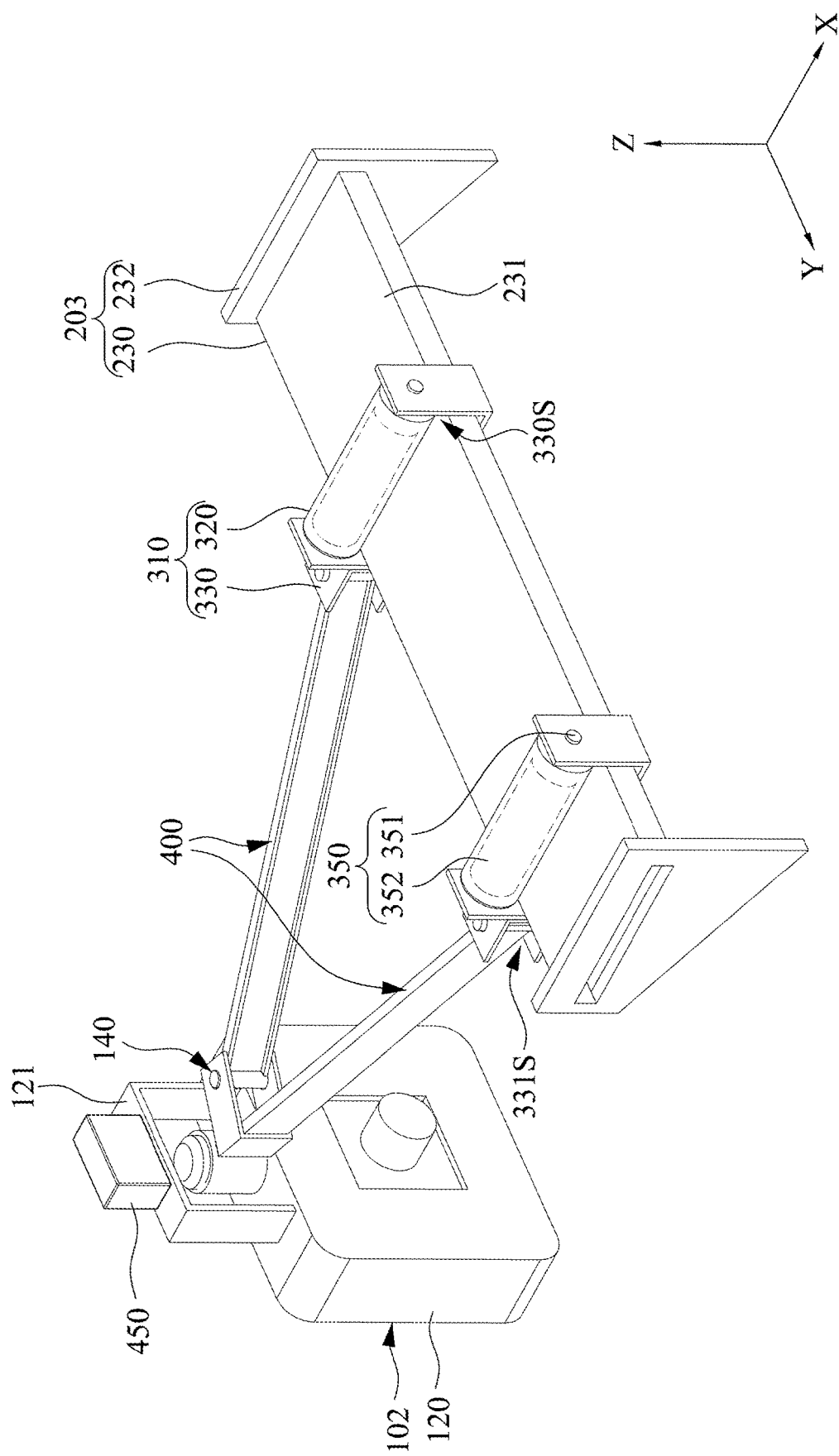
FIG. 8 is a schematic diagram of FIG. 7 viewed from another aspect.

FIG. 7 is a schematic view of a charging station 13 according to one embodiment of the present disclosure. FIG. 8 is a schematic diagram of FIG. 7 viewed from another aspect. As shown in FIG. 7 and FIG. 8, this embodiment is substantially the same as the above-mentioned embodiment, except that the support member 203 of this embodiment is a load board 230 rather than a linear frame. For example, the load board 230 is fixed on a wall (not shown) through a holder 232, and the disclosure is not limited thereto.

Each of the movable members 310 includes a roller member 320 and a roller rack 330. The roller rack 330 is pivotally connected to the third pivoting portion 420 of one of the supporting arms 400. The roller member 320 is pivotally mounted on the roller rack 330 to abut against a top surface 231 of the load board 230 for relatively moving along the top surface 231 of the load board 230. The motor device 350 is coaxially arranged within the roller member 320.

More specifically, the roller rack 330 is provided with an upper concave portion 330S and a side concave portion 331S, respectively. The load board 230 and the roller member 320 are both located within the upper concave portion 330S of the roller rack 330, and the roller member 320 is pivotally connected to the upper concave portion 330S. The third pivoting portion 420 of the supporting arm 400 is located in the side concave portion 331S of the roller rack 330, and the third pivoting portion 420 is pivotally connected to the side concave portion 331S. The motor device 350 is, for example, a roller motor coaxially arranged in the roller member 320. The main body 352 of the motor device 350 is embedded within one of the roller members 320, and the rotating shaft 351 is fixed to the roller rack 330 through the roller member 320, and the shaft axle (e.g., Y axis) of the roller member 320 and the long axis direction (e.g., X axis) of the load board 230 are orthogonal to each other. In this way, when the motor device 350 is activated, through the main body 352 of the motor device 350 rotating relative to the rotating shaft 351 for rotating the roller member 320 synchronously, thus, the roller member 320 is able to be reciprocatedly moved on the load board 230.

Figure 9:
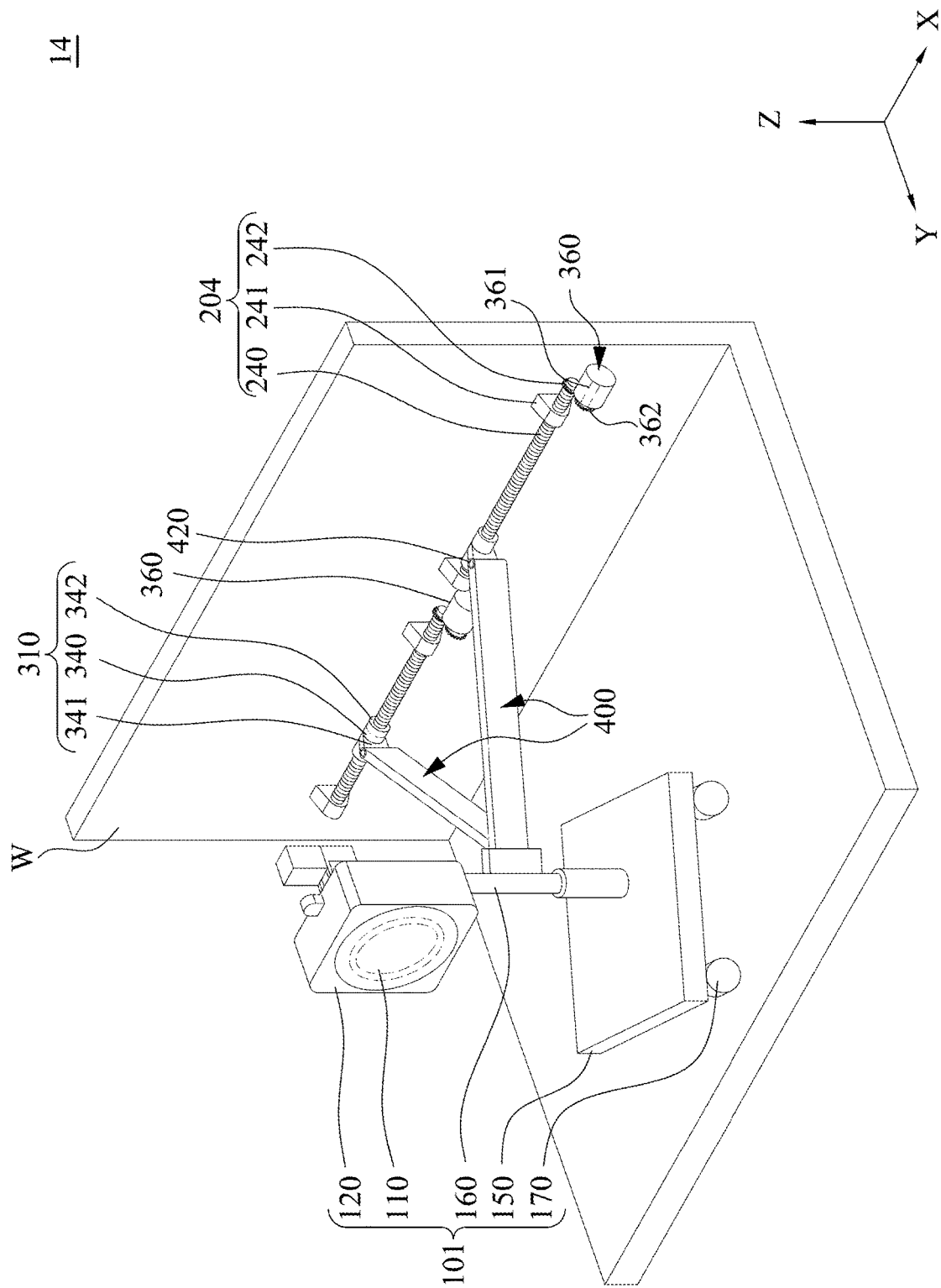
FIG. 9 is a schematic view of a charging station according to one embodiment of the present disclosure.

FIG. 9 is a schematic view of a charging station 14 according to one embodiment of the present disclosure. As shown in FIG. 9, this embodiment is substantially the same as the above-mentioned embodiment, except that the support member 204 includes two screw rods 240 which are coaxially aligned with each other. For example, the screw rods 240 are fixed on a wall W through the base 241, however, the disclosure is not limited to this. Each of the movable members 310 includes an outer housing 342, a moving bolt nut 340 and a shaft-received frame 341. The moving bolt nut 340 is restricted within the outer housing 342, and screwed to one of the screw rods 240 so that the moving bolt nut 340 in the outer housing 342 can be screwed along the screw rods 240, thereby driving the outer housing 342 to be reciprocatedly moved along the screw rods 240. Each of the motor devices 360 includes a rotating shaft 361 and an interlocking gear 362 surrounding the rotating shaft 361. Each of the motor devices 360 meshes a gear 242 on the screw rods 240 through the interlocking gears 362 so as to synchronously move the moving bolt nut 340 along the screw rods 240. The long axis direction (e.g., Y axis) of each of the screw rods 240 and the shaft axis (e.g., Y axis) of the moving bolt nut 340 are coaxial with each other. In the embodiment, the screw rod is, for example, a ball screw, however, the disclosure is not limited to this.

In addition, the front-mount module 101 further includes a base 150 and a bracket 160. The bracket 160 is connected to the front frame 120, is erected on the base 150, and is pivotally connected to the supporting arms 400. In this way, since the charging head 110 is with a specific weight, thus, the base 150 not only can support the charging head 110 of the front-mount module 101, but also relieve the burden of the supporting arms 400 so as to assist for loading the charging head 110. Also, the front-mount module 101 further includes a plurality of rotating wheels 170. The rotating wheels 170 are respectively pivotally connected above the base 150, so that the base 150 can be slidably located on a ground for assisting the front-mount module 101 to freely on the ground. However, the disclosure is not limited to thereto, and in other embodiments, the above-mentioned rotating wheels may be replaced by a universal ball to improve the moving efficiency.

Figure 10:
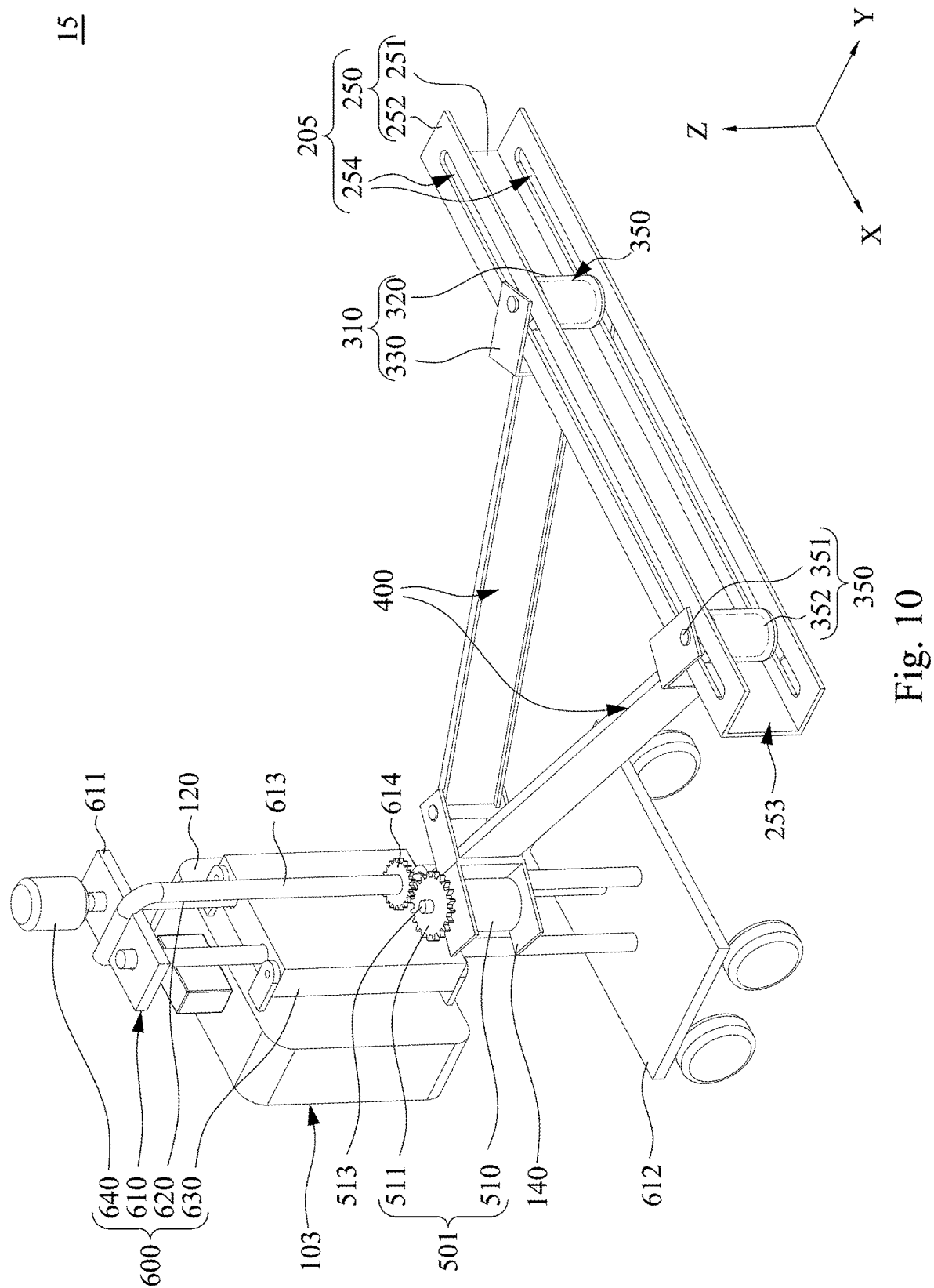
FIG. 10 is a schematic view of a charging station according to one embodiment of the present disclosure.

FIG. 10 is a schematic view of a charging station 15 according to one embodiment of the present disclosure. As shown in FIG. 10, this embodiment is substantially the same as the above-mentioned embodiment, except that the front-mount module 103 further includes an elevating module 600 including a shelf 610, two guiding posts 620, a carrier 630 and an elevating motor 640. The guiding posts 620 are uprightly disposed on the shelf 610. The carrier 630 is elevatably sleeved on the guiding posts 620, and connected to the front frame 120. The elevating motor 640 is electrically connected to the control unit 700 (FIG. 1), connected to the carrier 630, and used to drive the charging head 110 to move (e.g., ascend and descend) along the guiding posts 620.

More specifically, the shelf 610 includes a top plate 611, a base seat 612 and a support post 613. The top plate 611 and the base seat 612 are spaced apart from each other. One end of the support post 613 is erected on the base seat 612, and the other end of the support post 613 is curvedly connected to one surface of the top plate 611 opposite to the base seat 612. The guiding posts 620 are vertically located between the top plate 611 and the base seat 612. For example, the elevating motor 640 enables the carrier 630 to be driven to ascend and descend along the guiding posts 620 through conventional means of ball screws, belts or racks. In this way, according to the position of the receiving coil 810 of the mobile vehicle 800 (FIG. 1), the charging station 15 can control the ascending and descending movement of the front frame 120 through the operation of the elevating motor 640 to appropriately adjust the height of the charging head.

Furthermore, the steering module 501 of the charging station 15 includes a steering motor 510 and a first gear 511. The steering motor 510 is disposed on the front-mount module 103, for example, on the second pivoting frame 140 described above, and electrically connected to the control units 700 (FIG. 1). The first gear 511 is coaxially connected to a rotation shaft 513 of the steering motor 510. The shelf 610 is provided with a second gear 614. The support post 613 as an upright column, penetrates through the second gear 614, and the second gear 614 is fixedly connected to the support post 613, meshed with the first gear 511, and used to adjust a rotating angle of the charging head 110 relative to the supporting arms 400 through an operation of the steering motor 510. Therefore, the charging station 15 can appropriately adjust the rotation angle of the charging head 110 relative to the supporting arms 400 through the steering module 501 according to the position of the receiving coil 810 of the mobile vehicle 800 (FIG. 1).

Furthermore, the support member 205 includes a linear frame and two elongated openings 254. The linear frame 250 is formed with a bottom plate 251 and two side plates 252. The side plates 252 are respectively located on two opposite sides of the bottom plate 251, and commonly extend in the same direction so that a receiving groove 253 is defined by the bottom plate 251 and the side plates 252. The elongated openings 254 are respectively formed on the side plates 252 and communicated with the receiving groove 253. Each of the movable members 310 includes a roller rack 330 and a roller member 320. The roller rack 330 is slidably disposed on one surface of the linear frame 250 being corresponding to the bottom plate 251, and pivotally connected to one of the supporting arms 400. The roller member 320 is totally disposed within the linear frame 250, abuts against the bottom plate 251, rotatably located within the receiving groove 253, and pivotally connected to the roller rack 330 through the elongated openings 254. The motor device 360 is coaxially arranged within the roller member 320.

Figure 11:
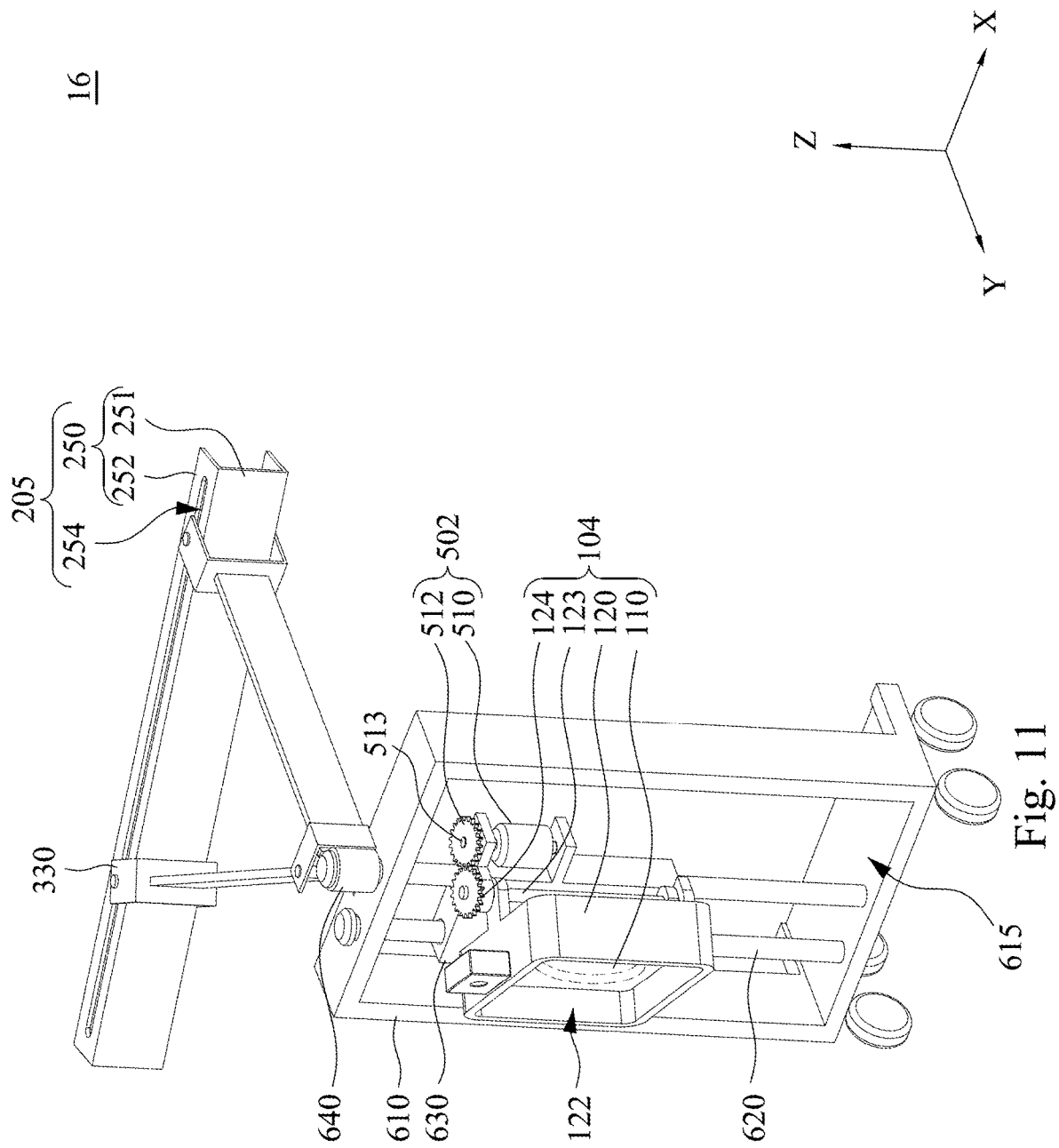
FIG. 11 is a schematic view of a charging station according to one embodiment of the present disclosure.

FIG. 11 is a schematic view of a charging station 16 according to one embodiment of the present disclosure. As shown in FIG. 11, this embodiment is substantially the same as the above-mentioned embodiment, except that the steering module 502 in this embodiment is located between the charging head 110 and the elevating module 600 rather than being located between the supporting arms 400 and the elevating module 600, so that the charging head 110 can pivot relative to the elevating module 600.

More specifically, the steering module 502 includes a steering motor 510 and a third gear 512. The steering motor 510 is fixed to the carrier 630, and electrically connected to the control units 700 (FIG. 1). The third gear 512 is coaxially connected to the rotating shaft of the steering motor 510 (not shown in figures). The carrier 630 is provided with a pivot portion 631 (e.g., shaft-received hole), and the front-mount module 104 further includes a fourth gear 124 and a rotating rod 123. The rotating rod 123 is connected to the front frame 120 and is pivotally connected to the pivot portion 631. The fourth gear 124 is coaxially connected to the rotating rod 123 and meshes with the third gear 512. In this way, through the operation of the steering motor 510, the rotation angle of the charging head 110 relative to the carrier 630 can be adjusted.

Also, compared with the shelf 610 in FIG. 10, the shelf 610 in FIG. 11 is in a square shape to surround a surrounding opening 615. The guiding posts 620 are located uprightly in the surrounding opening 615.

Figure 12:
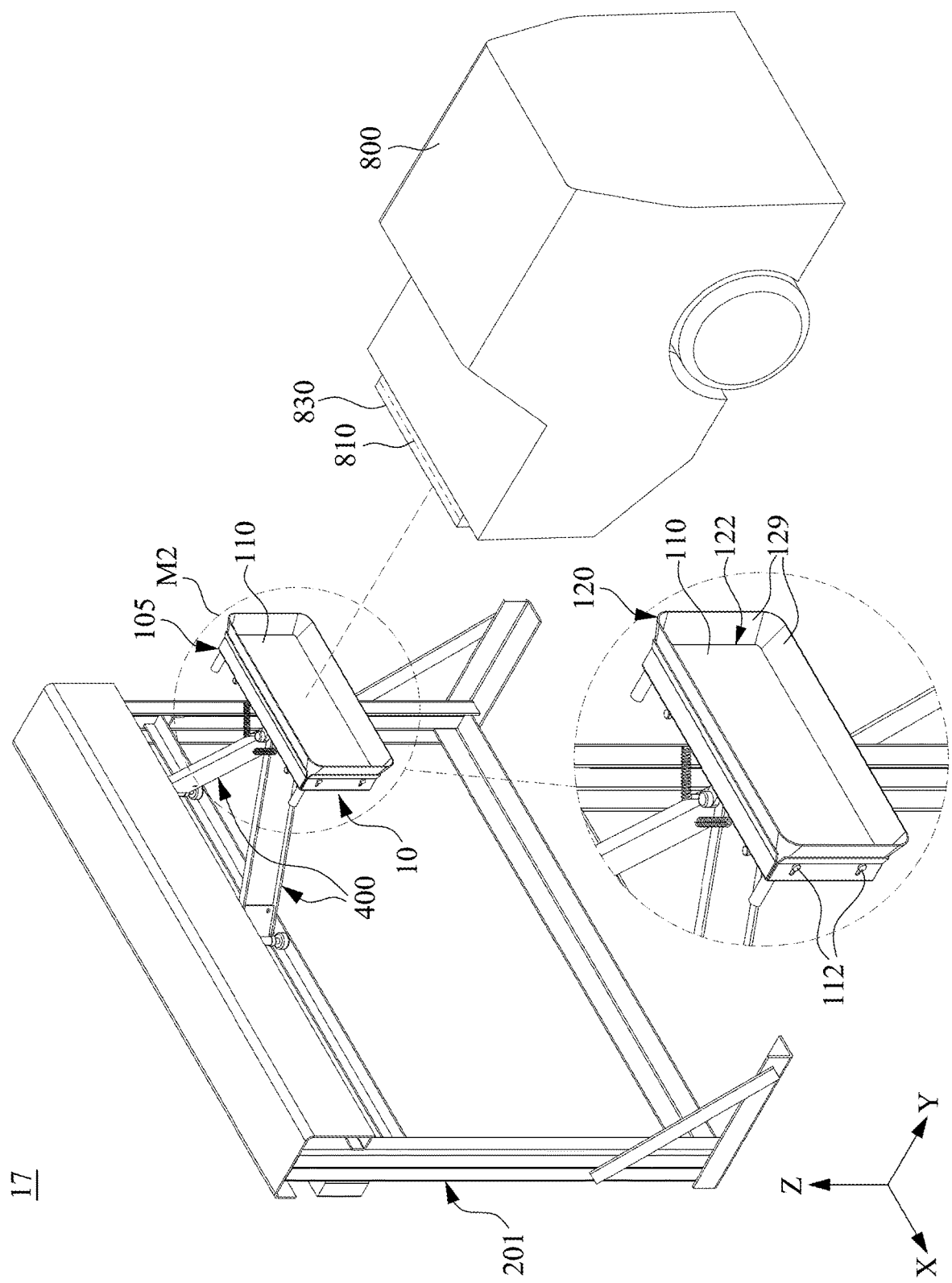
FIG. 12 is a schematic view of a charging station as well as a partial enlarged view of an area M2 of FIG. 12 according to one embodiment of the present disclosure.
Figure 13:
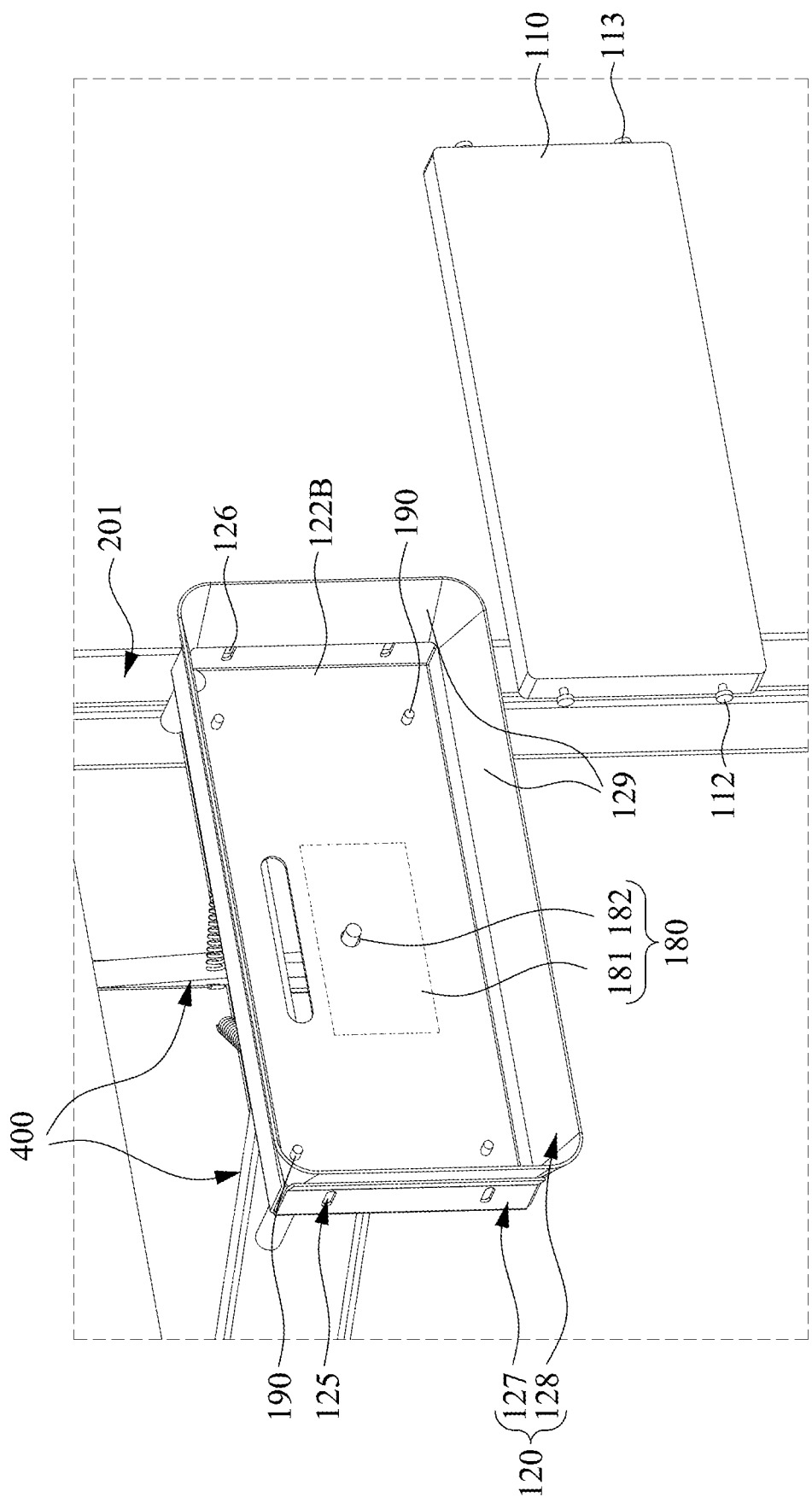
FIG. 13 is a schematic view of a charging head of FIG. 12.

Reference is now made to FIG. 12 to FIG. 13, in which FIG. 12 is a schematic view of a charging station 17 as well as a partial enlarged view of an area M2 of FIG. 12 according to one embodiment of the present disclosure, and FIG. 13 is a schematic view of a charging head of FIG. 12. As shown in FIG. 12 and FIG. 13, this embodiment is substantially the same as the above-mentioned embodiment, except that the charging head 110 is slidably disposed within the recess 122, that is, the charging head 110 is able to approach or move away from the bottom 122B of the recess 122 along the depth direction (e.g., Y axis) of the recess 122 (FIG. 13). More specifically, the front frame 120 is formed with two first guide grooves 125 and two second guide grooves 126. The first guide grooves 125 are spaced arranged on one of the opposite sides of the front frame 120, and the second guide grooves 126 are spaced arranged on the other of the opposite sides of the front frame 120 (FIG. 13). The long axis direction of each of the first guide grooves 125 and the second guide grooves 126 is parallel to the depth direction (e.g., Y axis) of the recess 122.

The charging head 110 includes two first guide members 112 and two second guide members 113, which are respectively protruded from two opposite surfaces of the charging head 110. Thus, through the first guide members 112 respectively being engaged with the first guide grooves 125 and the second guide members 113 respectively being engaged with the second guide grooves 126, the charging head 110 is able to be reciprocated along the depth direction (e.g., Y axis) between the first guide grooves 125 and the second guide grooves 126. Specifically, the first guide members 112 are spaced arranged on one of the opposite sides of the charging head 110, and respectively slidably located within the first guide grooves 125. The second guide members 113 are spaced arranged on the other of the opposite sides of the charging head 110, and respectively slidably located within the second guide grooves 126.

In addition, the front-mount module 105 includes a power switch 180 and one or plural cushion elastic members 190. The cushion elastic members 190 are distributed within the recess 122, and be abutted against by the charging head 110. In this embodiment, each of the cushion elastic members 190 is, for example, a retractable pin, however, the disclosure is not limited thereto, and in other embodiments, the cushion elastic member 190 may also be a spring or rubber, etc. The power switch 180 includes a wiring board 181 and a power key 182. The wiring board 181 is located outside the recess 122, and at one surface of the front frame 120 being opposite to the recess 122. The power key 182 is soldered on one surface of the wiring board 181, and the power key 182 protrudes into the recess 122 via an opening of the bottom 122B of the recess 122.

Figure 14A:
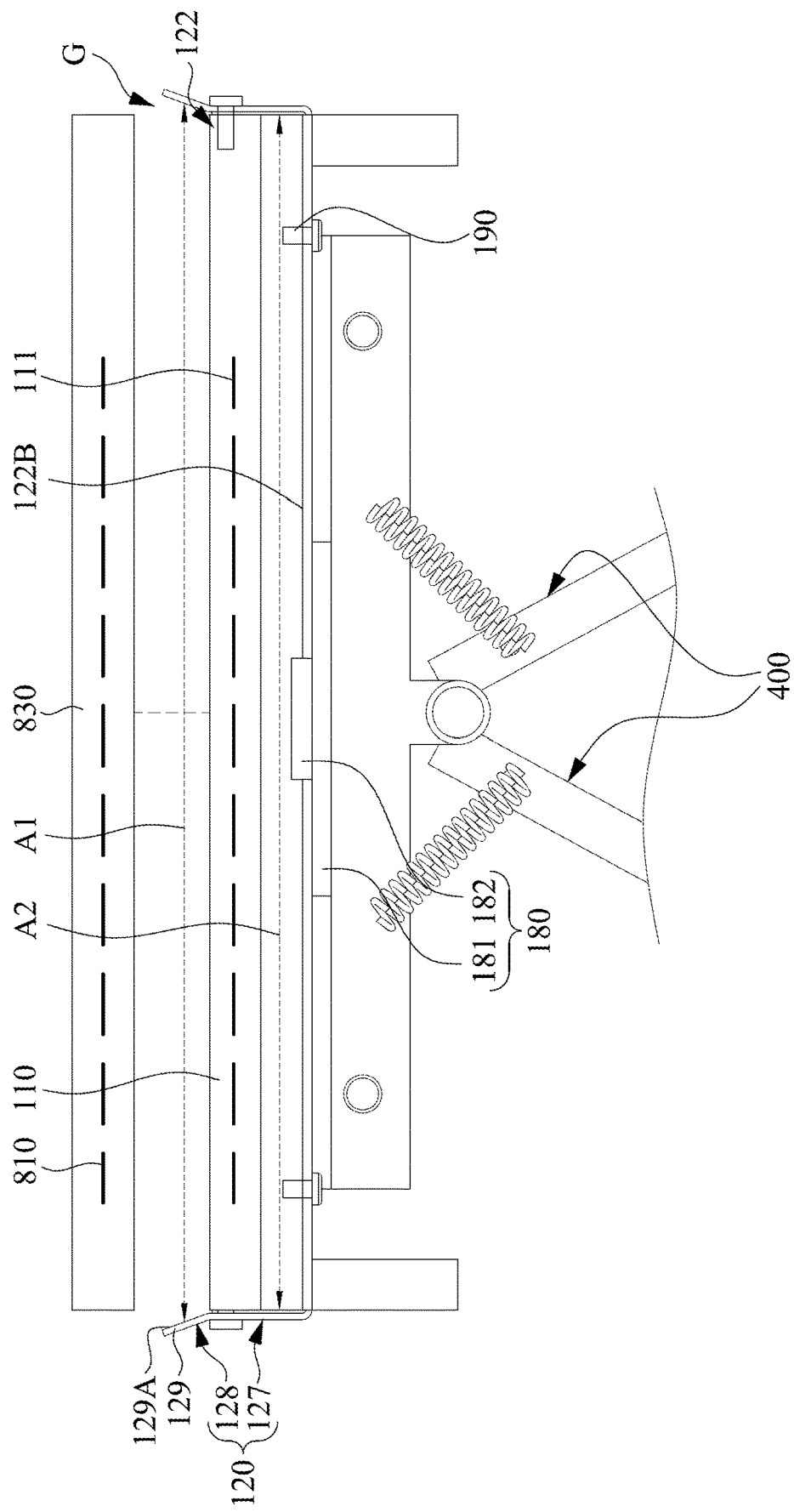
FIG. 14A and FIG. 14B are operation schematic views of the charging head shown in FIG. 12.
Figure 14B:
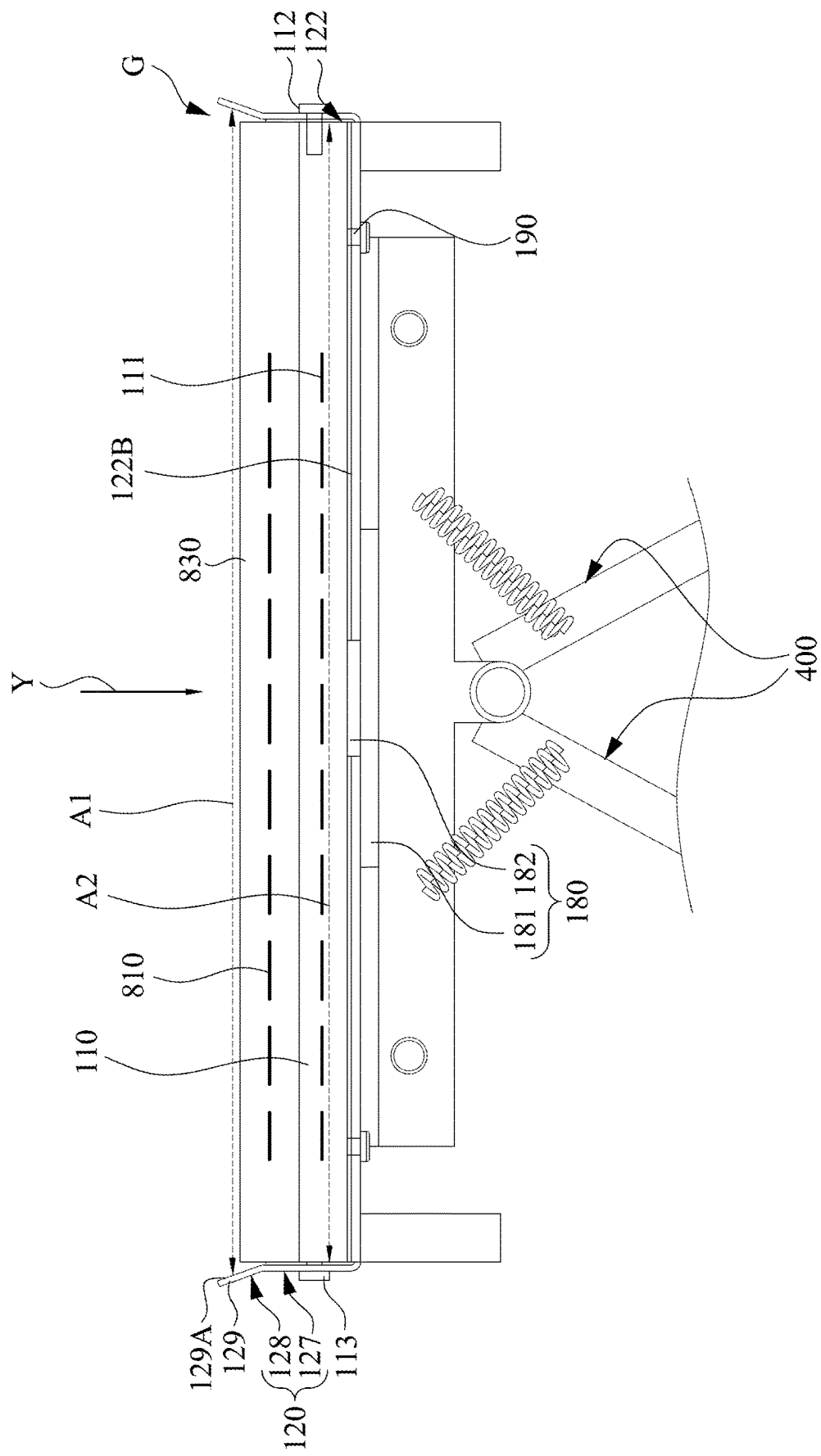

FIG. 14A and FIG. 14B are operation schematic views of the charging head 110 shown in FIG. 12. As shown in FIG. 12 and FIGS. 14A to 14B, when the mobile vehicle 800 docks to the charging station 17, and the protruding portion 830 of the mobile vehicle 800 having the receiving coil 810 can exactly extend into the recess 122, the protruding portion 830 pushes the charging head 110 along the depth direction (e.g., Y axis) of the recess 122 so as to trigger the power switch 180 (e.g., physically pressing the power key 182) and squeeze the cushion elastic members 190 at the same time. Thus, since the power switch 180 is triggered, in respond to that, the circuit (not shown in figures) on the wiring board 181 is electrically conducted to the power supply coil 111, and the power supply coil 111 starts to receive electrical power from a power supply externally so as to induce the charging coil 810, thereby, avoiding wasting resources. On the contrary, as shown in FIG. 12 and FIG. 14A, when the protruding portion 830 leaves the charging head 110 from the recess 122, the restoring elastic force of the cushion elastic member 190 is released to push the charging head 110 back to an original position of the charging head 110 in the recess 122 along the depth direction (e.g., Y axis) of the recess 122.

Furthermore, the front frame 120 further includes a cover 127 and a guiding portion 128. The above-mentioned recess 122 is formed within the cover 127. The cover 127 is rectangular, however, the disclosure is not limited to the shape (e.g., circle or triangle) of cover 127, in other embodiment, the shape of cover for example, may be circle or triangle. The guiding portion 128 is connected to one side of the cover 127 facing away from the support member 201, and the guiding portion 128 is embodied as a funnel member gradually expanding outwards from edges of the surface of the cover 127 in a radiative manner. Thus, the guiding portion 128 surrounds to form a trapezoidal space G (FIG. 14A), and a maximum caliber A1 of the trapezoidal space G is larger than a maximum caliber A2 of the recess 122. More specifically, the guiding portion 128 includes a plurality (e.g., four) of inclined guiding plates 129 respectively located at the edges of the surface of the cover 127. Each of the inclined guiding plates 129 has a sloped surface 129A, and the sloped surfaces 129A of the inclined guiding plates 129 collectively define the aforementioned trapezoidal space G. In this way, the sloped surface of each of the inclined guiding plates 129 can guide the protruding portion 830 of the mobile vehicle 800 to insert into the recess 122 efficiently.

Figure 15:
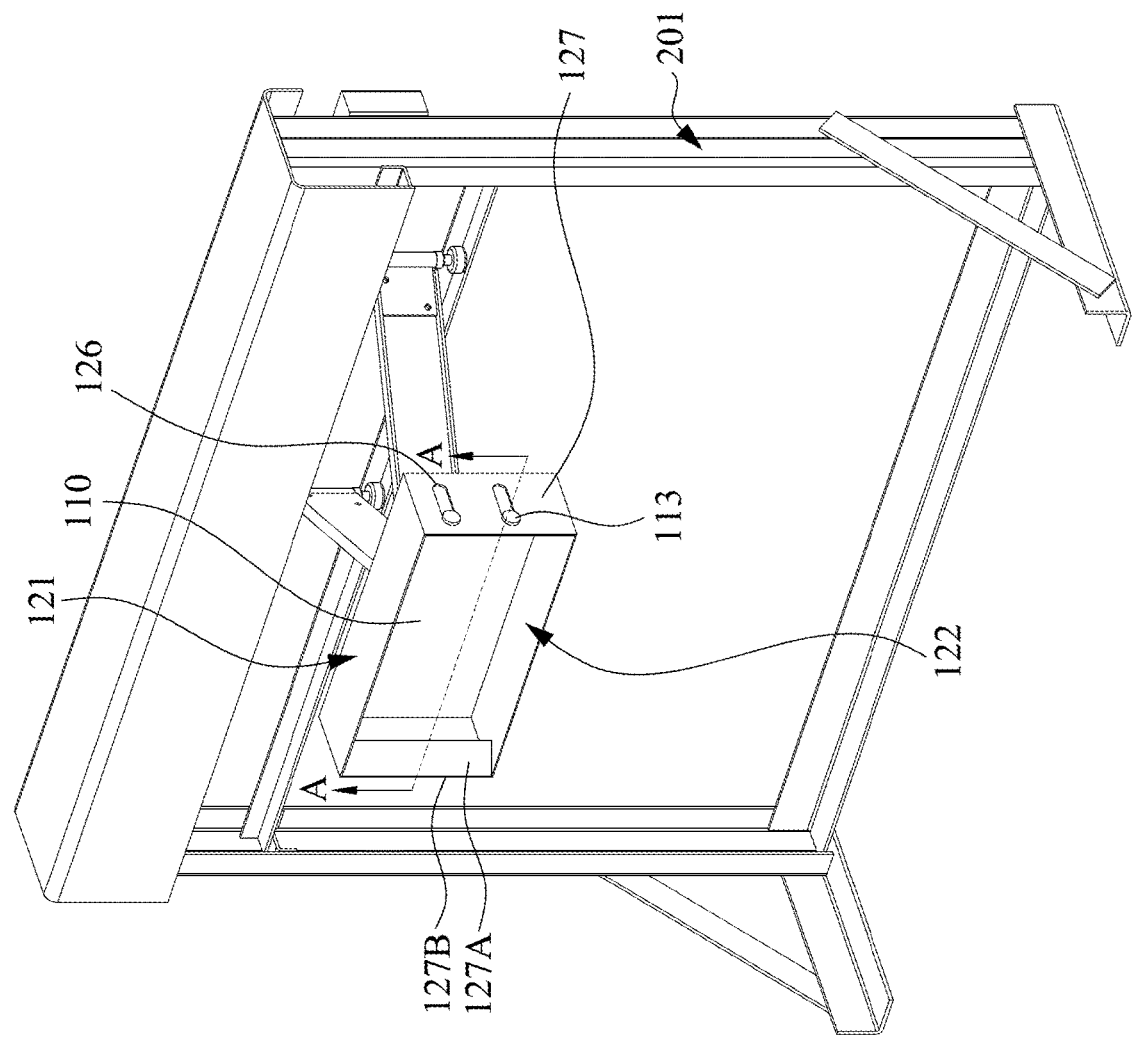
FIG. 15 is a schematic view of a charging station according to one embodiment of the present disclosure.
Figure 16:
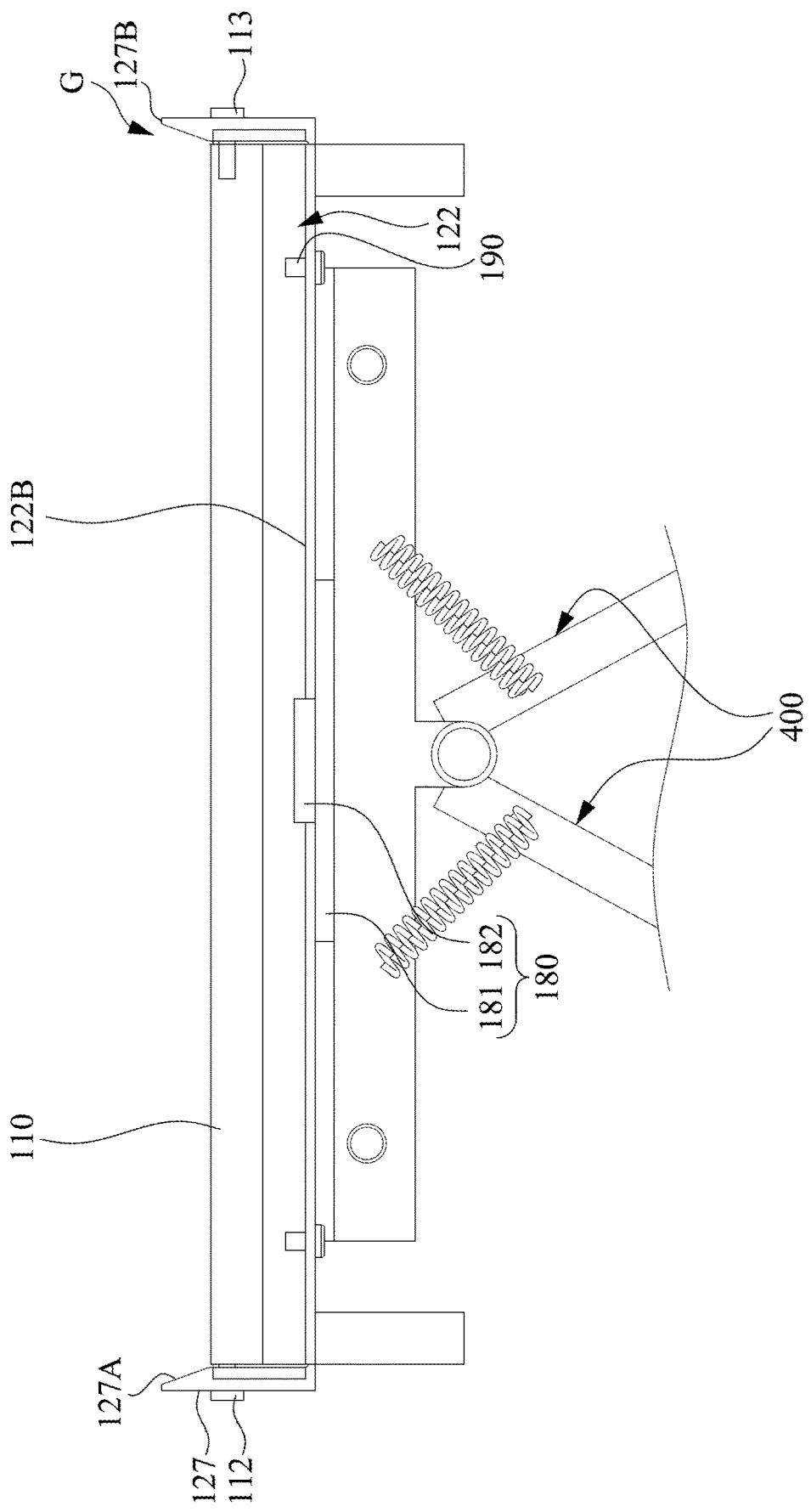
FIG. 16 is a cross-sectional view of the charging head of FIG. 15 viewed along a line A-A.

Reference is now made to FIG. 15 to FIG. 16, in which FIG. 15 is a schematic view of a charging station 18 according to one embodiment of the present disclosure. FIG. 16 is a cross-sectional view of the charging head 110 of FIG. 15 viewed along a line A-A. As shown in FIG. 15 and FIG. 16, this embodiment is substantially the same as the above-mentioned embodiment of FIG. 14A, except that the guiding portion is embodied as one part of the cover 127, that is, each of the sloped surface 127A of the guiding portion is located in the cover 127, and connected to one end surface 127B of the cover 127 facing away from the supporting arms 400. In the embodiment, two opposite inclined guiding plates 129 at the front edges of the cover 127 are respectively folded inwardly to form this guiding portion, so as to facilitate the accurate alignment of the charging head 110 and the protruding portion 830 (FIG. 14A). It is noted, the height of the cover 127 in this embodiment is fixed, and only the left and right inclined guiding plates 129 are folded inward to make the the sloped surfaces 127A. However, the sloped surfaces are not limited in quantity.

In the above embodiments, for example, the motor devices 350, 360 are brushless motors, servo motors or stepping motors, the detecting element 450 is an image capture element or a photo interrupter, and each of the control units 700 is a central processing unit, a single-chip module or a cloud server, however, the disclosure is not limited to the types and installation positions of the aforementioned detecting elements, control units and motor devices. In addition, the mobile vehicle 800 is an electric car, and the charging coil 810 is embedded in the rear compartment of the electric car, or fixed outside the rear compartment of the electric car, however, the disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A charging station, comprising:
   a front-mount module comprising a charging head and a first coil disposed within the charging head for inducing a second coil of a mobile vehicle;
   at least one support member separated from the front-mount module;
   two moving assembles, each of the moving assembles comprising a movable member supported by the at least one support member, and a motor device used for moving the movable member along the at least one support member;
   two supporting arms, each of the supporting arms that is pivotally connected to the front-mount module and one of the movable members, respectively; and
   at least one control unit electrically connected to the motor devices for controlling the motor devices to adjust a position of the front-mount module.

2. The charging station of claim 1, wherein the front-mount module further comprises:
   a front frame; and
   a recess formed on one surface of the front frame and receiving the charging head,
   wherein one part of the charging head is protruded outwards from the recess, or the charging head is totally received inside the recess.

3. The charging station of claim 2, further comprising:
   a steering module connected to the front frame and at least one of the supporting arms, and used to control a rotating angle of the charging head relative to the supporting arms.

4. The charging station of claim 2, wherein the front-mount module further comprises:
   an elevating module comprising:
      a shelf;
      at least one guiding post uprightly disposed on the shelf;
      a carrier elevatably sleeved on the at least one guiding post, and connected to the front frame; and
      an elevating motor electrically connected to the at least one control unit, connected to the carrier, and used to drive the charging head to move along the at least one guiding post.

5. The charging station of claim 4, further comprising:
   a steering module comprising:
      a steering motor disposed on the front-mount module, and electrically connected to the at least one control unit; and
      a first gear coaxially connected to a rotation shaft of the steering motor,
   wherein the shelf is provided with an upright column and a second gear, and the upright column penetrates through the second gear, the second gear is fixedly connected to the upright column, meshed with the first gear, and used to adjust a rotating angle of the charging head relative to the supporting arms through an operation of the steering motor.

6. The charging station of claim 4, further comprising:
a steering module comprising:
   a steering motor fixed to the carrier, and electrically connected to the at least one control unit; and
   a third gear coaxially connected to a rotation shaft of the steering motor,
wherein the carrier is provided with a pivoting portion, and the front-mount module further comprises a fourth gear and a rotating rod, the rotating rod is connected to the front frame, and pivotally connected to the pivoting portion, and the fourth gear is coaxially connected to the rotating rod, and meshed with the third gear, and the fourth gear is used to adjust a rotating angle of the charging head relative to the carrier through an operation of the steering motor.

7. The charging station of claim 2, wherein the front-mount module further comprises a base connected to the front frame and supporting the charging head.

8. The charging station of claim 2, wherein the front-mount module further comprises a pivot shaft and a pivoting frame, and the pivoting frame is fixedly connected to the front frame, and provided with at least one first pivot portion; and
   one end of each of the supporting arms is provided with a second pivot portion,
   wherein the at least one first pivot portion and the second pivot portions of the supporting arms are coaxially aligned together so as to be commonly inserted through by the pivot shaft.

9. The charging station of claim 2, wherein the front-mount module further comprises a pivot shaft and a pivoting frame, and the pivoting frame is formed with a through opening and a first pivot portion; and
   one end of one of the supporting arms is provided with a second pivot portion, and the first pivot portion and the second pivot portion are coaxially aligned together so as to be commonly inserted through by the pivot shaft, and one end of the other of the supporting arms passes through the through opening and pivotally connected to the front frame.

10. The charging station of claim 2, further comprising:
a detecting element that is connected to the front frame, and electrically connected to the at least one control unit for detecting a position of the second coil of the mobile vehicle.

11. The charging station of claim 2, wherein the front-mount module comprises a power switch disposed within the recess, and the charging head is slidably disposed within the recess,
   wherein when the charging head is pushed to trigger the power switch along a depth direction, in respond to that, the power switch allows the first coil to receive electric power from a power supply externally.

12. The charging station of claim 11, wherein the front-mount module further comprises at least one cushion elastic member mounted on the front frame within the recess, and the charging head abuts against the at least one cushion elastic member within the recess,
   wherein when a protruding portion of the mobile vehicle having the second coil therein is moved into the recess to trigger the power switch through the charging head, the at least one cushion elastic member is pressed to store a restoring elastic force by the charging head, when the protruding portion of the mobile vehicle is moved away from the recess, the restoring elastic force of the at least one cushion elastic member is released to push the charging head back to an original position of the charging head.

13. The charging station of claim 11, wherein two guide grooves are respectively formed on two opposite sides of the front frame, and two guide members are respectively protruded from two opposite surfaces of the charging head,
   wherein, through the guide members respectively being engaged with the guide grooves, the charging head located between the guide grooves is able to be reciprocated along a depth direction.

14. The charging station of claim 2, wherein the front frame comprises:
   a guiding portion disposed on the one surface of the front frame, and the guiding portion comprising at least one sloped surface for guiding a protruding portion of the mobile vehicle having the second coil therein to the charging head within the recess.

15. The charging station of claim 1, wherein the at least one support member comprises a linear frame that is formed with a receiving groove; and
   each of the movable members comprises:
      a first shaft-received frame slidably disposed on the linear frame;
      a second shaft-received frame connected to the first shaft-received frame, and pivotally connected to one of the supporting arms; and
      a rotatable wheel rotatably located within the receiving groove, partially protruding outwards from the receiving groove, and pivotally connected to the first shaft-received frame.

16. The charging station of claim 1, wherein the at least one support member comprises:
   a linear frame that is formed with a receiving groove; and
   an elongated slot formed on one side of the linear frame, and communicated with the receiving groove; and
   each of the movable members comprises:
      a shaft-received frame slidably disposed on the one side of the linear frame, and pivotally connected to one of the supporting arms; and
      a rotatable wheel totally disposed within the linear frame, rotatably located within the receiving groove, and pivotally connected to the shaft-received frame through the elongated slot.

17. The charging station of claim 1, wherein the at least one support member comprises:
   a load board having a top surface; and
   each of the movable members comprises:
   a roller rack pivotally connected to one of the supporting arms; and
   a roller member pivotally mounted on the roller rack to abut against the top surface of the load board, wherein the motor device is coaxially arranged within the roller member.

18. The charging station of claim 1, wherein the at least one support member comprises:
   two screw rods, each of the screw rods is connected to one of the motor devices; and
   each of the movable members comprises:
      an outer housing;
      a moving bolt nut restricted within the outer housing, and screwed to one of the two screw rods; and
      a shaft-received frame disposed on the outer housing and pivotally connected to one of the supporting arms.

19. The charging station of claim 1, wherein the at least one support member comprises:
- a linear frame formed with a bottom plate and two side plates, the side plates respectively located on two opposite sides of the bottom plate, and commonly extend in the same direction so as to define a receiving groove with the bottom plate; and
- two elongated openings respectively formed on the side plates and communicated with the receiving groove; and each of the movable members comprises:
- a roller rack disposed on one surface of the linear frame being corresponding to the bottom plate, and pivotally connected to one of the supporting arms; and
- a roller member totally disposed within the linear frame, abutting against the bottom plate, rotatably located within the receiving groove, and pivotally connected to the roller rack through the elongated openings.

20. The charging station of claim 1, wherein the at least one support member comprises:
- a first linear frame formed with a first receiving groove;
- a second linear frame formed with a second receiving groove that is parallel to the first receiving groove; and each of the movable members comprises:
- a shaft-received frame disposed between the first linear frame and the second linear frame;
- a rotatable wheel rotatably located within the first receiving groove, and pivotally connected to one end of the shaft-received frame;
- a sliding block slidably disposed within the second receiving groove; and
- a pivot shaft pivotally connected one of the supporting arms to the shaft-received frame, wherein one end of the pivot shaft is pivotally connected to the other end of the shaft-received frame, and the other end of the pivot shaft is connected to the sliding block.

* * * * *